(12) United States Patent
Endres et al.

(10) Patent No.: US 9,169,565 B2
(45) Date of Patent: Oct. 27, 2015

(54) METALLIC SUBSTRATES COMPRISING A DEFORMABLE GLASS-TYPE COATING

(75) Inventors: Klaus Endres, Homburg (DE); Helmut Schmidt, Saarbruecken-Guedingen (DE); Martin Mennig, Quierschied (DE)

(73) Assignee: EPG (ENGINEERED NANOPRODUCTS GERMANY) AG, Griesheim (DE)

( * ) Notice: Subject to any disclaimer, the term of this patent is extended or adjusted under 35 U.S.C. 154(b) by 1811 days.

(21) Appl. No.: 10/585,099

(22) PCT Filed: Jan. 4, 2005

(86) PCT No.: PCT/EP2005/000024
§ 371 (c)(1),
(2), (4) Date: Sep. 28, 2006

(87) PCT Pub. No.: WO2005/066388
PCT Pub. Date: Jul. 21, 2005

(65) Prior Publication Data
US 2008/0118745 A1 May 22, 2008

(30) Foreign Application Priority Data
Jan. 5, 2004 (DE) .......................... 10 2004 001 097

(51) Int. Cl.
C23D 5/02 (2006.01)
C23C 18/12 (2006.01)
C09D 1/02 (2006.01)
C09D 183/04 (2006.01)

(52) U.S. Cl.
CPC .............. *C23C 18/1275* (2013.01); *C09D 1/02* (2013.01); *C09D 183/04* (2013.01); *C23C 18/122* (2013.01); *C23C 18/1212* (2013.01); *C23C 18/1241* (2013.01); *C23C 18/1254* (2013.01); *C23C 18/1279* (2013.01); *C23C 18/1283* (2013.01); *C23D 5/02* (2013.01); *Y02T 50/67* (2013.01); *Y10T 428/265* (2015.01)

(58) Field of Classification Search
USPC ...................................................... 427/376.2
See application file for complete search history.

(56) References Cited

U.S. PATENT DOCUMENTS

| 3,565,749 | A | * | 2/1971 | Wizon .......................... 428/367 |
| 4,851,150 | A | * | 7/1989 | Hench et al. .................. 516/111 |
| 5,091,224 | A | | 2/1992 | Kushida et al. |
| 5,614,251 | A | | 3/1997 | Sakamoto et al. |
| 5,731,091 | A | | 3/1998 | Schmidt et al. |
| 6,012,304 | A | * | 1/2000 | Loxley et al. ................... 65/111 |
| 6,156,388 | A | | 12/2000 | Endres et al. |
| 6,162,498 | A | | 12/2000 | Mennig et al. |
| 2003/0024277 | A1 | * | 2/2003 | Costa et al. ..................... 65/395 |
| 2003/0118841 | A1 | * | 6/2003 | Horne et al. ............... 428/425.9 |

FOREIGN PATENT DOCUMENTS

| DE | 69618837 | * | 10/1996 |
| DE | 1 9645043 | | 5/1998 |
| DE | 1 9714949 | | 10/1998 |
| DE | 1 0059487 | | 6/2006 |
| EP | 0368101 | | 5/1990 |
| EP | 0729442 | | 9/1996 |
| JP | 2-097581 | | 4/1990 |
| JP | 7-228840 | | 8/1995 |

OTHER PUBLICATIONS

McGill: http://web.archive.org/web/20020427181641/http://www.mcgillairpressure.com/vac/textdocs/aboutus.html dated by the Internet Archive Wayback Machine as available on Apr. 27, 2002.*
Chou et al. "Sol-Gel Derived Hybrid Coatings for Corrosion Protection" in Journal of Sol-Gel Science and Technology 25, 321-327, 2003.*
Callister, Materials Science and Engineering: An Introduction, 5th ed. (c) 2000, John Wiley & Sons, Inc. p. 169-171.*
English language Abstract of DE 10059487.
English language Abstract of JP 7-228840.
English language Abstract of JP 2-097581.

* cited by examiner

Primary Examiner — Nathan Empie
(74) Attorney, Agent, or Firm — Abel Law Group, LLP

(57) ABSTRACT

Metallic substrates having a deformable vitreous coating, obtainable by applying an alkali metal silicate-containing coating sol to the substrate and thermally densifying the layer thus obtained in a two-stage heat treatment process, the heat treatment being carried out, in the first stage, either (A) in an oxygen-containing atmosphere or (B) in a vacuum at a residual pressure of ≤15 mbar and, in the second stage, in a low-oxygen atmosphere up to full densification with formation of a vitreous layer.

33 Claims, No Drawings

METALLIC SUBSTRATES COMPRISING A DEFORMABLE GLASS-TYPE COATING

CROSS-REFERENCE TO RELATED APPLICATIONS

The present application is a U.S. National Stage of International Application No. PCT/EP2005/000024, filed Jan. 4, 2005, which claims priority of German Patent Application No. 10 2004 001 097.8, filed Jan. 5, 2004.

BACKGROUND OF THE INVENTION

1. Field of the Invention

The invention relates to metallic substrates having a deformable, especially cold-deformable, vitreous coating, to a process for their production and to their use.

2. Discussion of Background Information

Vitreous coatings on metal substrates such as steel or aluminum are generally produced by means of enameling processes. To this end, a particulate composition is applied to an adhesive layer applied beforehand and melts on heating to give a glass. In order to obtain continuous, impervious layers, however, the layer thicknesses generally have to be >50 µm. As a result of this, the layers, though, become inflexible and brittle, they are sensitive to bending, shock and impact, and flake off. Thermal injection processes too are incapable of producing deformable layers.

Various investigations on the application of thin inorganic layers to steel surfaces by means of the sol-gel process have already been carried out. For example, attempts have been made to apply zirconium dioxide layers to stainless steel in order to improve the corrosion resistance. Borosilicate glass layers have also been investigated. However, it was found that the refractory systems (high-melting oxides such as $ZrO_2$) do not lead to impervious layers via these techniques and that the borosilicate glass layers can be applied only in layer thicknesses significantly below 1 µm, so that sufficient mechanical and chemical protection is not ensured. These processes have therefore not gained any industrial significance.

It is also known that transparent, crack-free and also one-dimensionally flexible vitreous layers with layer thicknesses in the lower µm range can be produced on metal surfaces with specific alkali metal ion-containing $SiO_2$ coatings sols which comprise colloidal $SiO_2$ particles; see DE 19714949 A1 and DE 10059487 A1. The nanoparticles present in the coating sols used there can be added to the sol from an external source or else generated in situ. The layers are applied with customary techniques and, after a drying step at temperatures up to 500° C., thermally densified. The thermal densification can be effected either in air or alternatively in oxygen-free nitrogen atmosphere. The coatings thus produced are only suitable for industrial applications in which a limited hydrolytic stability and no moisture-sensitive attrition resistance are required and in which the visual appearance plays only a minor role.

For example, it has been found that layers on stainless steel which have been densified at 500° C. under air have good scratch resistance (<150 µm in the IEC test with 20 N and tungsten carbide tip, radius 1 mm), but, on closer inspection, they have readily discernible discolorations in different gray to brown tones which may occur more or less homogeneously or else inhomogeneously, i.e. in a blotchy manner. Moreover, it is found after boiling for about 1 hour in tap water that the scratch resistance falls significantly (≥230 µm in the IEC test with 20 N and tungsten carbide tip, radius 1 mm), the layer changes its appearance and may peel off partially from the substrate.

On the other hand, it is found that layers densified at 500° C. under $N_2$ atmosphere do not show the slight discolorations described above but have very poor chemical stability.

In both cases, cold deformation of the coating, for example on stainless steel sheet, is not possible. The layers burst even at bending radii of <5 mm (two-dimensional).

It is apparent that these unsatisfactory properties of the coatings are based on an inhomogeneous, unsuitable and irreproducible microstructure of the layers. An exact analysis is not possible, since the layers are vitreous and hence X-ray-amorphous. The structural units are within the lower nm range and, owing to their chemical composition (alkali metal silicate) are very low in contrast even for ultra-high-resolution transmission electron microscopy.

Owing to these unsatisfactory properties, serious disadvantages arise in the subsequent processing of coated metal substrates. For example, it is not possible to carry out any thermoforming-like reshaping processes. Equally, use in hot aqueous media is only possible to a limited extent.

It is therefore an object of the present invention to provide metallic substrates having a deformable vitreous coating with improved mechanical and chemical properties.

SUMMARY OF THE INVENTION

The present invention provides a metallic substrate having a deformable vitreous coating. The substrate is obtainable by a process comprising
(a) application of an alkali metal silicate-containing coating sol to the substrate to provide a coating layer; and
(b) thermal densification of the coating layer of (a) by a two-stage heat treatment.

The heat treatment comprises, in a first stage, a heat treatment carried out either (A) in an oxygen-containing atmosphere or (B) in a vacuum at a residual pressure of ≤15 mbar and, in a second stage, a heat treatment in a low-oxygen atmosphere up to full densification with formation of a vitreous layer.

In one aspect of the substrate, the heat treatment of the first stage may be carried out according to alternative (A) at an end temperature of up to about 400° C. or, according to alternative (B), at an end temperature of up to about 500° C.

In another aspect of the substrate, the heat treatment of the second stage may be carried out at an end temperature in the range of from 400° to 600° C. and/or in an inert gas atmosphere.

In another aspect of the substrate of the present invention, the process may further comprise a cooling of the heat-treated substrate in an oxygen-containing or low-oxygen atmosphere.

In yet another aspect of the substrate, the alkali metal silicate-containing coating sol may be obtainable by a process which comprises a hydrolysis and polycondensation of one or more silanes of formula (I)

$$R_nSiX_{4-n} \qquad (I)$$

wherein the radicals X independently represent hydrolyzable groups or hydroxyl groups, the radicals R independently represent hydrogen, alkyl, alkenyl and alkynyl groups having up to 4 carbon atoms and aryl, aralkyl and alkaryl groups having from 6 to 10 carbon atoms, and n is 0, 1 or 2, with the proviso that at least one silane where n=1 or 2 is used,
or oligomers derived therefrom,
in the presence of
(a) at least one compound selected from oxides and hydroxides of alkali metals and alkaline earth metals, and
(b) optionally, nanoscale $SiO_2$ particles.

By way of non-limiting example, the at least one compound may be used in such an amount that an atomic ratio Si:(alkali metal and/or alkaline earth metal) is in a range of from 20:1 to 7:1, e.g., in a range of from 15:1 to 10:1, and/or the average value of n in the silanes of formula (I) may be from 0.2 to 1.5, e.g., from 0.5 to 1.0.

In a still further aspect of the substrate, the thickness of the vitreous coating may be from 1 to 6 μm, e.g., from 1.5 to 5 μm, or from 2.5 to 4.5 μm.

In yet another aspect, the substrate may have been subjected to a cold forming and/or may have a structured surface.

In yet another aspect, the substrate may comprise one or more metals selected from aluminum, tin, zinc, copper, chromium and nickel and/or the substrate may comprise steel, an aluminum alloy, a magnesium alloy and/or a copper alloy. For example, the substrate may comprise at least one of steel, stainless steel, zinc-plated steel, chromium-plated steel and enameled steel.

The present invention also provides a process for making a metallic substrate. This process is the process by which the metallic substrate of the present invention as set forth above (including the various aspects thereof) is obtainable.

In one aspect of the process, the heat treatment of the first stage may be carried out according to alternative (A) at an end temperature of up to about 400° C. and/or the oxygen-containing atmosphere in the first stage may comprise from 15% to 90% by volume of oxygen.

In another aspect of the process, the heat treatment of the first stage may be carried out according to alternative (B) at an end temperature of up to about 500° C. For example, the heat treatment may be carried out at an end temperature of up to about 200° C. and at a residual pressure of 5 mbar.

In yet another aspect of the process of the present invention, the heat treatment of the second stage may be carried out at an end temperature in the range of from 400° to 600° C. For example, the heat treatment of the second stage may be carried out at an end temperature in the range of from 540° to 560° C. and in an atmosphere which comprises ≤0.5% by volume of oxygen, e.g., in an inert gas atmosphere.

In a still further aspect, the process may further comprise a cooling of the heat-treated substrate at a cooling rate of from 1 to 10 K/min.

DETAILED DESCRIPTION OF THE INVENTION

The invention provides a metallic substrate having a deformable vitreous coating, obtainable by applying an alkali metal silicate-containing coating sol to the substrate and thermally densifying the layer thus obtained in a two-stage heat treatment process, the heat treatment being carried out, in the first stage, either (A) in an oxygen-containing atmosphere or (B) in a vacuum at a residual pressure of ≤15 mbar and, in the second stage, in a low-oxygen atmosphere up to full densification with formation of a vitreous layer.

In the first heat treatment stage, certain organic residues or components which disrupt the structure formation and hence the layer properties and stem, for example, from incompletely hydrolyzed precursors or coating additives, for example surfactants, leveling agents or solvents, are removed thermally, fully or down to a desired, very low residue content. According to the invention, this is done, in variant A, in an oxygen-containing atmosphere having an oxygen content of, for example, from 15 to 90% by volume, preferably from 19 to 20% by volume, up to an end temperature of about 400° C., or, alternatively, in variant B, in a vacuum at a residual pressure of ≤15 mbar, preferably ≤5 mbar and more preferably ≤2.5 mbar, up to an end temperature of about 500° C., preferably up to about 200° C. and more preferably up to about 120° C.

In the second thermal heat treatment stage, further densification is effected to form a vitreous layer. The second heat treatment stage is carried out in a low-oxygen atmosphere up to an end temperature in the range from 400 to 600° C., preferably from 500 to 600° C. and more preferably from 540 to 560° C. A low-oxygen atmosphere is understood to mean an oxygen-free atmosphere or an atmosphere having only a very low oxygen content (≤0.5% by volume). The low-oxygen atmosphere employed is preferably an inert gas such as nitrogen or argon, or vacuum with an air pressure of ≤10 mbar.

The residence times at the maximum temperatures are typically from 5 to 75 min, preferably from 20 to 60 min and more preferably from 45 to 60 min.

The cooling phase from about 400 to 500° C. downward can be effected either in low-oxygen atmosphere (for example under inert gas such as nitrogen) or else in oxygen-containing atmosphere (for example by blowing in compressed air). This firstly allows the cooling rates to be controlled, and it is secondly possible to adjust the hydrophilic or hydrophobic character of the coating in a controlled manner by leaving, on the surface, a certain amount of hydrophobic organic radicals which have not been oxidized fully during the heating phase working with oxygen. The cooling rate is generally from 1 to 10 K/min, preferably from 2 to 7 K/min.

In this way, it is possible for the first time with both variants of the thermal densification to produce cold-deformable vitreous layers on metal. This property cannot be attributed solely to the layer thickness, since it is not observed, for example, in thin glasses known from display technology. Nor it is achievable with coating sols of analogous chemical composition which have been densified by processes described in DE 19714949 A1 and DE 10059487 A1. Without wishing to be bound to a particular theory, a possible structural model for this new layer material is suspected to be nanoscale $SiO_2$ structural units which are joined to one another via alkali metal ions in a relatively undirected manner so as to be readily "shiftable" with one another, so that a layer material forms which has vitreous hardness but is nevertheless plastically and three-dimensionally deformable within limits. When organic radical groups (for example methyl or phenyl groups) still remain, additional points of division can arise and contribute to an increase in the flexibility. It is also possible to adjust the visual appearance on the one hand and the scratch resistance and hydrolytic stability on the other hand independently of one another.

The alkali metal silicate-containing coating sol used is preferably a coating composition which is obtained by hydrolysis and polycondensation of at least one organically modified hydrolyzable silane in the presence of alkali metal oxides or alkaline earth metal oxides or alkali metal hydroxides or alkaline earth metal hydroxides and optionally nanoscale $SiO_2$ particles.

Such a coating composition is, for example, obtainable by hydrolysis and polycondensation of one or more silanes of the general formula (I)

$$R_nSiX_{4-n} \qquad (I)$$

in which the X groups, identically or differently from one another, are hydrolyzable groups or hydroxyl groups, the R radicals, identically or differently from one another, are hydrogen, alkyl, alkenyl and alkynyl groups having up to 4 carbon atoms and aryl, aralkyl and alkaryl groups having from 6 to 10 carbon atoms, and n is 0, 1 or 2, with the proviso that at least one silane where n=1 or 2 is used, or oligomers derived therefrom,
in the presence of
a) at least one compound from the group of the oxides and hydroxides of the alkali metals and alkaline earth metals and optionally
b) added nanoscale $SiO_2$ particles.

This allows vitreous layers whose thickness may, for example, be up to 10 µm to be obtained on metallic surfaces without crack formation occurring in the course of drying and in the course of densification. The applied coating compositions may, for example, be converted to impervious $SiO_2$ films on stainless steel or steel surfaces even at relatively low temperatures (generally from 400° C.). The layers produced in accordance with the invention generally have a thickness of from 1 to 6 µm, preferably from 1.5 to 5 µm and in particular from 2.5 to 4.5 µm. They form a hermetically sealing layer which prevents or drastically reduces oxygen ingress to the metallic surface even at relatively high temperatures and ensures outstanding corrosion protection. The resulting layers are attrition-resistant and flexible, so that curves or deviations in the surface do not lead to any cracks or impairments of the layer whatsoever.

Suitable metallic surfaces to be coated in accordance with the invention are all surfaces of semi-finished products or finished products which consist of a metal or of a metal alloy or comprise them. Examples of surfaces of metal include those of aluminum, tin, zinc, copper, chromium or nickel, including zinc-plated, chromium-plated or enameled surfaces. Examples of metal alloys are in particular steel or stainless steel, aluminum alloys, magnesium alloys and copper alloys such as brass and bronze. Particular preference is given to using metallic surfaces of steel, stainless steel, zinc-plated, chromium-plated or enameled steel.

Before the application of the coating composition, the metal surface is preferably cleaned thoroughly and especially freed of grease and dust. Before the coating, a surface treatment, for example by corona discharge, may also be carried out.

The metallic surface or the metallic substrate may have a flat or a structured surface. The metallic surface preferably has a structured surface. It may be a micro-structured surface or a structure of larger dimensions. The structure may be regular, as obtained, for example, by embossing, or irregular, as obtained, for example, by roughening.

The structured metal surface can be obtained by treating normal metallic substrates with surfaces which are flat within the error limits. The metallic surfaces can be structured, for example, by roughening, etching, irradiating with laser light (lasering) or embossing. Roughening of the metallic surface is, for example, possible by sandblasting, glass bead blasting or brushing. The processes for structuring metallic surfaces are known to those skilled in the art. The structuring can, for example, achieve decorated effects.

The invention is suitable in particular for the production of vitreous surface layers on buildings and parts thereof; means of locomotion and transport and parts thereof; equipment, apparatus and machines for commercial or industrial purposes and research and parts thereof; household items and equipment for the household and parts thereof; equipment, devices and aids for games, sport and leisure and parts thereof; and devices, aids and apparatus for medical purposes and invalids.

Specific examples of such coatable materials or items as a substrate are specified below. The coated surfaces are preferably surfaces of steel or stainless steel.

Built structures (especially buildings) and parts thereof:
Internal and external facades of buildings, floors and stairways, escalators, lifts, for example their walls, banisters, furniture, paneling, fittings, doors, handles (especially with anti-fingerprint finishes, for example door handles), sheetmetal for facades, floor-coverings, windows (especially window frames, window sills and window handles), blinds, fittings in the kitchen, bathroom and toilet, shower cubicles, sanitary cubicles, toilet cubicles, generally objects in the sanitary sector (for example toilets, wash basins, fittings, accessories), pipes (and especially drainpipes), radiators, light switches, lamps, lighting, letterboxes, cash dispensers, information terminals, seawater-resistant coating for the finishing of harbor constructions, eaves, gutters, aerials, satellite dishes, handrails on banisters and escalators, ovens, wind turbines, especially rotor blades, monuments, sculptures, and generally works of art with metallic surfaces, especially those which are exhibited outdoors.

Means of locomotion and transportation (for example passenger vehicle, heavy goods vehicle, omnibus, motor bike, moped, bicycle, railway, tramway, ship and aeroplane) and parts thereof:
Mudguards for bicycles and motorbikes, instruments on motorbikes, door handles, steering wheels, tire rims, exhaust systems and pipes, thermally stressed parts (engine parts, linings, valves and valve linings), fittings, latent heat exchangers, coolers, parts of the interior trim with metallic surface (for example as a scratch-resistant coating), fuel nozzle, luggage carrier, roof container for passenger vehicles, display instruments, tankers, for example for milk, oil or acid, and generally all chassis parts and seawater-resistant coating for the finishing of ships and boats.

Equipment, devices and machines (for example from plant construction (chemical industry, foods industry, power plants) and energy technology) for commercial or industrial purposes and research and parts thereof:
Heat exchangers, compressor wheels, gap helical exchangers, copper elements for industrial heating, molds (for example casting molds, especially of metal), rubble chutes, filling plants, extruders, waterwheels, rollers, conveyor belts, printing machines, screenprinting templates, filling machines, (machine) casings, drill heads, turbines, pipes (internal and external, especially for liquid and gas transport), stirrers, stirred tanks, ultrasound baths, cleaning baths, containers, transport devices in ovens, internal lining of ovens for high-temperature, oxidation, corrosion and acid protection, gas bottles, pumps, reactors, bioreactors, tanks (for example fuel tanks), heat exchangers (for example in food processing technology or for (biomass) fuel tanks), waste air units, saw blades, covers (for example for balances), keyboards, switches, knobs, ball bearings, shafts, screws, solar cells, solar units, tools, tool handles, liquid containers, insulators, capillaries, laboratory equipment (for example chromatography columns and fume hoods) and parts of electrical accumulators and batteries.

Household items and equipment for the household and parts thereof:
Trash cans, dishware (for example of stainless steel), cutlery (for example knives), trays, pans, pots, baking tins, cooking utensils (for example graters, garlic presses and holders), hanging devices, refrigerators, cooking area frames, cooking hobs, hotplates, heated surfaces, baking ovens (internal and external), egg boilers, microwave units, kettles, grill grids, steamers, ovens, working surfaces, fittings in the kitchen sector, dust extractor hoods, flower vases, casings of TV equipment and stereo units, casings of (electrical) household equipment, Christmas tree baubles, furniture, furniture fronts made of stainless steel, sinks, lamps and lighting.

Equipment, devices and aids for games, sport and leisure:

Garden furniture, garden equipment, tools, playground equipment (for example slides), snowboards, scooters, golf clubs, dumbbells, weights, training equipment, fittings, sitting opportunities in parks, playgrounds, fitting items and equipment in swimming pools, etc.

Equipment, aids and devices for medical purposes and invalids:

Surgical instruments, cannulas, medical containers, syringes, implants, dental equipment, dental braces, spectacle frames, medical tools (for operations and dental treatment), mirrors made of metal (for example stainless steel) as medical mirrors, generally items from the sector of medical technology (for example pipes, apparatus, containers) and wheelchairs, and also quite generally hospital equipment for the purpose of improving hygiene.

Items which require electrical insulation, for example solar cells and capacitors. The composition according to the invention may serve here as an electrical insulating material in the form of insulation layers.

In addition to the above items, it is of course also possible to provide other items and parts thereof advantageously with the above surface layers, for example toys, jewelry, coins, mirrors made of metal (for example stainless steel) as cosmetic mirrors or traffic mirrors, urns, signs (for example traffic signs), traffic lights, postboxes, telephone boxes, waiting shelters for public transport, protective goggles, protective helmets, rockets, generally all items made of stainless steel, watch casings, watch straps, clock faces, writing implements made of metal, especially stainless steel, display instruments (manometers, thermometers) and electrical and electronic switches and components (for example integrated circuits or circuit boards and parts thereof).

According to the invention, particular advantages are achieved in the coating of metallic semifinished products or finished products which are subsequently cold-deformed.

The coating composition and its components will be described hereinafter.

Among the above silanes of the general formula (I) is at least one silane in whose general formula n has the value of 1 or 2. In general, at least two silanes of the general formula (I) are used in combination. In this case, these silanes are preferably used in such a ratio that the average value of n (on a molar basis) is from 0.2 to 1.5, preferably from 0.5 to 1.0. Particular preference is given to an average value of n in the range from 0.6 to 0.8.

In the general formula (I), the X groups, which are the same or different from one another, are hydrolyzable groups or hydroxyl groups. Specific examples of hydrolyzable X groups are halogen atoms (especially chlorine and bromine), alkoxy groups and acyloxy groups having up to 6 carbon atoms. Particular preference is given to alkoxy groups, in particular $C_{1-4}$-alkoxy groups such as methoxy, ethoxy, n-propoxy and i-propoxy. The X groups in one silane are preferably identical, particular preference being given to using methoxy or ethoxy groups.

The R groups in the general formula (I) which may be the same or different in the case that n=2 are hydrogen, alkyl, alkenyl and alkynyl groups having up to 4 carbon atoms and aryl, aralkyl and alkaryl groups having from 6 to 10 carbon atoms. Specific examples of such groups are methyl, ethyl, n-propyl, i-propyl, n-butyl, sec-butyl and tert-butyl, vinyl, allyl and proparyl, phenyl, tolyl and benzyl. The groups may have customary substituents, but such groups preferably do not bear any substituents. Preferred R groups are alkyl groups having from 1 to 4 carbon atoms, especially methyl and ethyl, and also phenyl.

It is preferred in accordance with the invention when at least two silanes of the general formula (I) are used, where n=0 in one case and n=1 in the other case. Such silane mixtures include, for example, at least one alkyltrialkoxysilane (e.g. (m)ethyltri(m)-ethoxysilane) and one tetraalkoxysilane (e.g. tetra(m)ethoxysilane) which are preferably used in such a ratio that the average value of n is within the above-specified preferred ranges. A particularly preferred combination for the starting silanes of the formula (I) is methyltri(m)ethoxysilane and tetra(m)ethoxysilane.

The hydrolysis and polycondensation of the silane(s) of the general formula (I) is carried out in the presence of at least one compound from the group of the oxides and hydroxides of the alkali metals and alkaline earth metals. These oxides and hydroxides are preferably those of Li, Na, K, Mg, Ca and/or Ba. Preference is given to using alkali metals, in particular Na and/or K. When an alkali metal oxide or hydroxide is used, it is preferably used in such an amount that the Si:alkali metal atomic ratio is in the range from 20:1 to 7:1, in particular from 15:1 to 10:1. In each case, the atomic ratio of silicon to alkali metal/alkaline earth metal is selected so (as to be sufficiently large) that the resulting coating is not water-soluble (as, for example, in the case of waterglass).

Any nanoscale $SiO_2$ particles used additionally to the hydrolyzable silanes of the general formula (I) are preferably used in such an amount that the ratio of all silicon atoms in the silanes of the general formula (I) to all silicon atoms in the nanoscale $SiO_2$ particles is in the range from 5:1 to 1:2, in particular from 3:1 to 1:1.

Nanoscale $SiO_2$ particles are understood to mean $SiO_2$ particles having an average particle size (or an average particle diameter) of preferably not more than 100 nm, more preferably not more than 50 nm and in particular no more than 30 nm. For this purpose, it is also possible, for example, to use commercial silica products, for example silica sols such as the Levasils®, silica sols from Bayer AG, or pyrogenic silicas, for example the Aerosil products from Degussa.

The particulate materials may also be added in the form of powders and sols. However, they may also be formed in situ in the hydrolysis and polycondensation of the silanes.

The hydrolysis and polycondensation of the silanes can be carried out in the absence or presence of an organic solvent. Preferably, no organic solvent is present. When an organic solvent is used, the starting components are preferably soluble in the reaction medium (which generally includes water). Suitable organic solvents are in particular water-miscible solvents, for example mono- or polyhydric aliphatic alcohols (for example methanol, ethanol), ethers (for example diethers), esters (for example ethyl acetate), ketones, amides, sulfoxides and sulfones. Otherwise, the hydrolysis and polycondensation may be carried out according to the modalities familiar to those skilled in the art.

The coating composition used in accordance with the invention may comprise additives customary in the coatings industry, for example additives controlling the rheology and the drying behavior, wetting and leveling agents, antifoams, solvents, dyes and pigments. Suitable solvents are, for example, alcohols and/or glycols, for example a mixture of ethanol, isopropanol and butylglycol. Commercial matting agents, for example microscale $SiO_2$ or ceramic powders, may also be added in order to achieve matt layers with anti-fingerprint properties. When used, the hydrolysis and polycondensation of the silanes can be effected in the presence of matting agents, for example microscale $SiO_2$ or ceramic powders. However, they may also be added to the coating composition at a later stage.

The coating composition used in accordance with the invention may be applied to the metallic surface by customary coating methods. Usable techniques are, for example, dipping, casting, flow-coating, spin-coating, spraying, spreading or screenprinting. Particular preference is given to automated coating processes such as flat spraying, use of spray robots and automatic spraying with machine-guided rotating or swiveling substrates. For dilution, customary solvents may be used, as are common in the coatings industry.

The coating composition applied to the metallic surface is normally dried at room temperature or slightly elevated temperature (for example a temperature up to 100° C., in particular up to 80° C., before it is densified thermally to a vitreous layer. The thermal densification can optionally be effected by IR or laser radiation.

If desired, at least one further (vitreous) layer may be applied to the (generally transparent and colorless) vitreous layer thus produced, for example a functional vitreous layer as described in the International Patent Application PCT/EP94/03423 (corresponding to EP-A-729442) or in DE-A-19645043. This functional vitreous layer may, for example, be a colored layer. Since such colored vitreous layers can be produced with the aid of a coating composition which comprises, for example, precursors for metal colloids, it is thus also possible to prevent the metallic surface from impairing or influencing the reactions of the metal colloid precursors, etc., since there is no direct contact between the metallic surface and the colored vitreous layer. Such a colored vitreous layer can be provided on the vitreous layer produced in accordance with the invention by providing the coating provided on the metallic surface in accordance with the invention, before it is thermally densified (and preferably after it has been dried at room temperature or elevated temperature) with the coating composition for the colored vitreous layer and then thermally densifying the two coatings together.

According to the invention, the metallic surface obtains a weather-resistant, corrosion-inhibiting, scratch-insensitive and chemical-resistant coating which in particular also helps to prevent soilings, for example by fingerprints, water, oil, grease, surfactants and dust.

The examples which follow illustrate the invention without restricting it.

EXAMPLE 1 a) Preparation of a Coating Sol

Chemicals used:
20 ml of methyltriethoxysilane
6 ml of tetraethoxysilane
15 g of Bayer 300 silica sol, 30% by weight (concentrated to 45% by weight)
0.3 ml of HCl (conc.)
5 ml of propanol The silanes are initially charged and the silica sol is added with vigorous stirring. After an emulsion has formed (approx. 20 seconds), the hydrochloric acid is added at the start of the hydrolysis. The mixture remains opaque for another 20-60 seconds and then abruptly becomes first viscous, then less viscous and clear. During the reaction, the sol becomes heated to approx. 40° C. After cooling to room temperature, it is filtered through a filter having a pore size of 0.8 μm (with a prefilter having a pore size of 5 μm). The sol thus produced can be adjusted to a desired viscosity with ethanol and is available for coating for at least 6 hours.

b) Coating of Stainless Steel Sheets

The coating sol obtained in section a) is applied to punched stainless steel sheets in a spraying process. After drying at room temperature, the coated sheets are thermally densified in a forced-air oven as follows:

1st stage: to 350° C. at a heating rate of 5 K/min while blowing in dried compressed air (oxygen fraction in the oven ≥19%)

2nd stage: to 560° C. at a heating rate of 5 K/min in a nitrogen atmosphere at an oxygen content of <0.5%

After a hold time of 60 min, the oven is cooled to 350° C. in this atmosphere at approx. 1 K/min, then in a compressed air atmosphere until removal from the oven.

The coatings thus produced have a very uniform steel-gray color. They are very scratch-resistant (<150 μm in the IEC test with 20 N and tungsten carbide tip, radius 1 mm) and attrition-resistant (crockmeter test with Scotch Brite with abrasive medium, load 1 kg, 500 cycles without visually discernible surface damage). These properties are retained even after boiling in water for 10 hours. The layers are cold-deformable up to a two-dimensional radius of 5 mm.

EXAMPLE 2

An alkali metal silicate coating sol is prepared according to Example 1 and applied to punched stainless steel sheets in a spraying process. After drying at room temperature, the coated sheets are thermally densified in a vacuum oven as follows:

1st stage: to 120° C. at a heating rate of 5 K/min with evacuation down to a pressure of <2.5 mbar.

2nd stage: up to 560° C. at a heating rate of 5 K/min in a nitrogen atmosphere.

After a hold time of 60 min, the oven is cooled at approx. 10 K/min in this atmosphere until removal from the oven.

The coatings thus produced are entirely colorless and transparent. They are very scratch-resistant (<150 μm in the IEC test with 20 N and tungsten carbide tip, radius 1 mm) and attrition-resistant (crockmeter test with Scotch Brite with abrasive medium, load 1 kg, 500 cycles without visually perceptible surface damage). These properties are retained even after boiling in water for 10 hours. The layers are cold-deformable up to a two-dimensional radius of 5 mm.

What is claimed is:

1. A process for making a metallic substrate having a vitreous coating, wherein the process comprises
(a) applying an alkali metal silicate-containing coating sol to the substrate to provide a coating layer on the substrate;
(b) drying the applied coating layer at a temperature of from room temperature up to 100° C. to obtain a dried coating layer, and
(c) thermally densifying the dried coating layer of (b) by a two-stage heat treatment comprising,
(i) in a first stage, a heat treatment carried out in an atmosphere comprising from 15% to 90% by volume of oxygen at an end temperature of from 350° C. to 400° C., and
(ii) in a second stage, further densification by a heat treatment in a low-oxygen atmosphere at an end temperature of from 400° C. to 600° C. up to full densification with formation of a vitreous layer;

and wherein the process further comprises cooling the heat-treated substrate at a cooling rate of from 1 to 10 K/min.

2. The process of claim 1, wherein the heat treatment of the second stage is carried out at an end temperature of from 500° to 600° C.

3. The process of claim 1, wherein the heat treatment of the second stage is carried out at an end temperature of from 540° to 560° C.

4. The process of claim 1, wherein the heat treatment of the first stage is carried out in an atmosphere comprising from 19% to 20% by volume of oxygen.

5. The process of claim 1, wherein the heat treatment of the second stage is carried out in an atmosphere which comprises 0.5% by volume of oxygen.

6. The process of claim 1, wherein the heat treatment of the second stage is carried out in an inert gas atmosphere.

7. The process of claim 3, wherein the heat treatment of the second stage is carried out in an atmosphere which comprises ≤0.5% by volume of oxygen.

8. The process of claim 3, wherein the heat treatment of the second stage is carried out in an inert gas atmosphere.

9. The process of claim 1, wherein (b) is carried out at a temperature of up to 80° C.

10. The process of claim 1, wherein the alkali metal silicate-containing coating sol is obtainable by a process comprising a hydrolysis and polycondensation of one or more silanes of formula (I)

$$R_nSiX_{4-n} \quad (I)$$

wherein the radicals X independently represent hydrolyzable groups or hydroxyl groups, the radicals R independently represent hydrogen, alkyl, alkenyl and alkynyl groups having up to 4 carbon atoms and aryl, aralkyl and alkaryl groups having from 6 to 10 carbon atoms, and n is 0, 1 or 2, with the proviso that at least one silane where n=1 or 2 is used, or oligomers derived therefrom, in the presence of (a) at least one compound selected from oxides and hydroxides of alkali metals and alkaline earth metals, and (b) optionally, nanoscale $SiO_2$ particles.

11. The process of claim 10, wherein the at least one compound is used in such an amount that an atomic ratio Si:(alkali metal and/or alkaline earth metal) is in a range of from 20:1 to 7:1.

12. The process of claim 11, wherein the atomic ratio is from 15:1 to 10:1.

13. The process of claim 10, wherein an average value of n in the silanes of formula (I) is from 0.2 to 1.5.

14. The process of claim 13, wherein the average value of n is from 0.5 to 1.0.

15. The process of claim 1, wherein the cooling rate is from 2 to 7 K/min.

16. The process of claim 1, wherein a thickness of the vitreous layer is from 1 to 6 μm.

17. The process of claim 1, wherein a thickness of the vitreous layer is from 1.5 to 5 μm.

18. The process of claim 1, wherein a thickness of the vitreous layer is from 2.5 to 4.5 μm.

19. The process of claim 1, wherein the substrate has a structured surface.

20. The process of claim 1, wherein the substrate comprises at least one of steel, stainless steel, zinc-plated steel, chromium-plated steel, enameled steel.

21. A process for making a metallic substrate having a vitreous coating, wherein the process comprises (a) applying an alkali metal silicate-containing coating sol to the substrate to provide a coating layer on the substrate;

(b) drying the applied coating layer at a temperature of from room temperature up to 100° C. to obtain a dried coating layer, and (c) thermally densifying the dried coating layer of (b) by a two-stage heat treatment comprising, (i) in a first stage, a heat treatment carried out in an atmosphere comprising from 15% to 90% by volume of oxygen at an end temperature of up to 400° C., and (ii) in a second stage, further densification by a heat treatment in a low-oxygen atmosphere at an end temperature of from 400° C. to 600° C. up to full densification with formation of a vitreous layer;

and wherein the process further comprises cooling the heat-treated substrate at a cooling rate of from 1 to 10 K/min.

22. The process of claim 21, wherein the heat treatment of the second stage is carried out at an end temperature of from 500° to 600° C.

23. The process of claim 21, wherein the heat treatment of the second stage is carried out at an end temperature of from 540° to 560° C.

24. The process of claim 21, wherein the heat treatment of the first stage is carried out in an atmosphere comprising from 19% to 20% by volume of oxygen.

25. The process of claim 21, wherein the heat treatment of the second stage is carried out in an atmosphere which comprises ≤0.5% by volume of oxygen.

26. The process of claim 21, wherein the heat treatment of the second stage is carried out in an inert gas atmosphere.

27. The process of claim 21, wherein (b) is carried out at a temperature of up to 80° C.

28. The process of claim 21, wherein the alkali metal silicate-containing coating sol is obtainable by a process comprising a hydrolysis and polycondensation of one or more silanes of formula (I)

$$R_nSiX_{4-n} \quad (I)$$

wherein the radicals X independently represent hydrolyzable groups or hydroxyl groups, the radicals R independently represent hydrogen, alkyl, alkenyl and alkynyl groups having up to 4 carbon atoms and aryl, aralkyl and alkaryl groups having from 6 to 10 carbon atoms, and n is 0, 1 or 2, with the proviso that at least one silane where n=1 or 2 is used, or oligomers derived therefrom, in the presence of (a) at least one compound selected from oxides and hydroxides of alkali metals and alkaline earth metals, and (b) optionally, nanoscale $SiO_2$ particles.

29. The process of claim 21, wherein the cooling rate is from 2 to 7 K/min.

30. The process of claim 21, wherein a thickness of the vitreous layer is from 1 to 6 μm.

31. The process of claim 21, wherein the substrate has a structured surface.

32. The process of claim 21, wherein the substrate comprises at least one of steel, stainless steel, zinc-plated steel, chromium-plated steel, enameled steel.

33. A process for making a metallic substrate having a vitreous coating, wherein the process comprises (a) applying an alkali metal silicate-containing coating sol to a substrate comprising at least one of steel, stainless steel, zinc-plated steel, chromium-plated steel, enameled steel to provide a coating layer on the substrate;

(b) drying the applied coating layer at a temperature of from room temperature up to 80° C. to obtain a dried coating layer, and (c) thermally densifying the dried coating layer of (b) by a two-stage heat treatment comprising, (iii) in a first stage, a heat treatment carried out in an atmosphere comprising from 19% to 20% by volume of oxygen at an end temperature of from 350° C. to 400° C., and (iv) in a second stage, further densification by a heat treatment in a low-oxygen atmosphere at an end temperature of from 540° C. to 560° C. up to full densification with formation of a vitreous layer having a thickness of from 1.5 to 5 μm;

and wherein the process further comprises cooling the heat-treated substrate at a cooling rate of from 2 to 7 K/min.

* * * * *